(No Model.)
W. HARTY.
SPRING TOOTH FOR HARROWS AND CULTIVATORS.
No. 245,718. Patented Aug. 16, 1881.
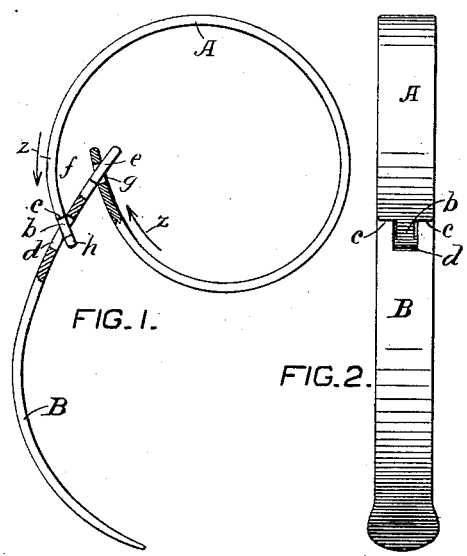
FIG. 1. FIG. 2.
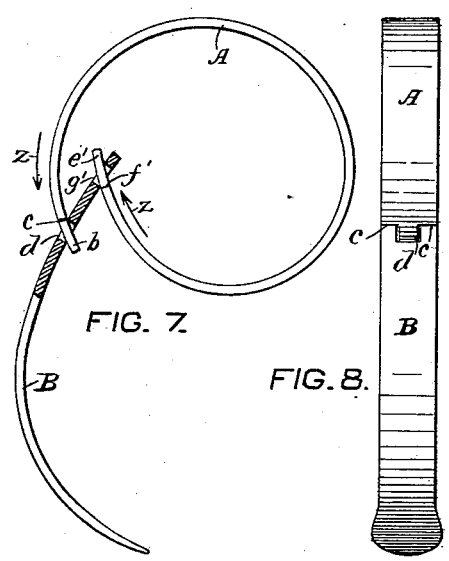
FIG. 7. FIG. 8.
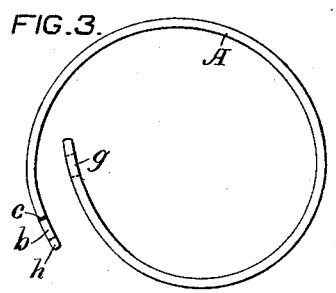
FIG. 3.
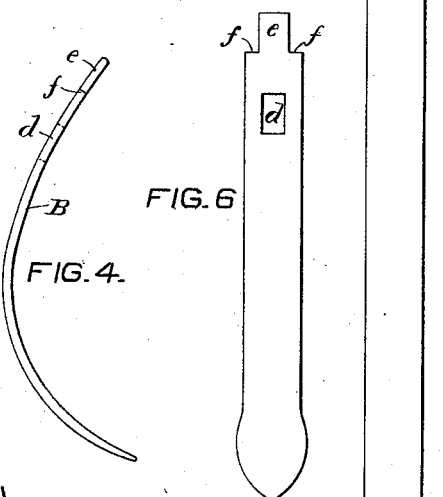
FIG. 5. FIG. 6. FIG. 4.
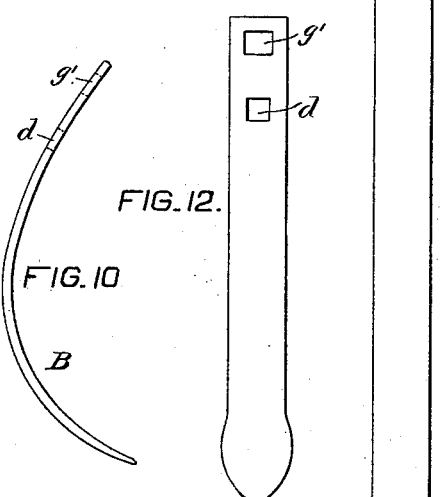
FIG. 9. FIG. 12. FIG. 10. FIG. 11.
WITNESSES:
James T. Goodfellow.
James H. Slade.
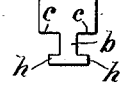
INVENTOR:
William Harty,
by Austin F. Park,
attorney.
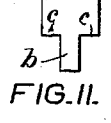

UNITED STATES PATENT OFFICE.

WILLIAM HARTY, OF JOHNSTOWN, PENNSYLVANIA.

SPRING-TOOTH FOR HARROWS AND CULTIVATORS.

SPECIFICATION forming part of Letters Patent No. 245,718, dated August 16, 1881.

Application filed February 16, 1881. (No model.)

*To all whom it may concern:*

Be it known that I, WILLIAM HARTY, of Johnstown, in the county of Cambria and State of Pennsylvania, have invented a new and useful Improvement in Spring-Teeth for Harrows and Cultivators, of which the following is a specification, reference being had to the accompanying drawings.

My invention relates to an improvement in such spring-teeth for harrows and cultivators as have the upper portion of the share jointed and secured in working position to the two end parts of a subvolute spring; and the general object of my invention is to so form the upper portion of the share and the two end parts of the subvolute spring as to thereby produce improved means for jointing and securing together the spring and share in proper working position.

In the aforesaid drawings, Figure 1 is a side or edge elevation, partly in section, and Fig. 2 a rear elevation, of one of my improved spring-teeth for harrows and cultivators. Figs. 3 and 4 are side or edge views of the separated spring and share of the tooth shown in Figs. 1 and 2. Figs. 5 and 6 are front elevations of the straight flat blanks from which the spring and share shown in Figs. 3 and 4 were formed by bending and tempering. Fig. 7 is a side or edge elevation, partly in section, and Fig. 8 a rear elevation, of another one of my improved spring-teeth. Figs. 9 and 10 are separate views of the spring and share of the tooth shown by Figs. 7 and 8; and Figs. 11 and 12 are front elevations of the blanks from which the same spring and share were formed.

A is the subvolute spring, and B the share of the spring-tooth.

In order to cheaply secure the two end parts of the spring A to the upper end portion or shank of the share B by fulcrum-like joints which shall be sufficiently strong and durable, and shall keep the share in proper working position while permitting it to have the required backward and somewhat lateral vibrating movements to pulverize the soil and pass over and around obstructions, and without having the plate-like share B or its upper portion twisted a quarter-way around into the plane of the spring, and without having the two ends of the spring jointed to the share by hinges having pivot-bolts, I form the outer end part of the spring A with the middle projecting tongue, $b$, and two lateral shoulders, $c$, Figs. 5 and 11, and make the upper portion of the share B with the perforation $d$, Figs. 6 and 12, adapted to receive the tongue $b$ of the spring and at the same time have its shoulders $c$ bear against the rear side of the shank of the share, as shown in Figs. 1, 2, 7, 8; and I also form the upper end part of the share B with the tongue or projection $e$, Fig. 6, with or without the shoulders $f$, and make the inner end part of the spring A with the perforation $g$, Fig. 5, adapted to receive the tongue $e$, as shown in Fig. 1; or, as an equivalent means for jointing and securing the upper end part of the share to the inner end part of the spring, I sometimes make that part of the spring with the tongue $e'$, Fig. 11, and shoulders $f'$, and the upper end part of the share with the perforation $g'$, Fig. 12, adapted to receive the tongue $e'$, while the shoulders $f'$ shall bear against the forward side or face of the upper part of the share, as represented in Fig. 7.

In Fig. 1 the perforation $d$, Fig. 6, is shown elongated in the lengthwise direction of the share, and the tongue $b$ on the outer end part of the spring has lateral lugs $h$, Fig. 5, to bear against the front face of the shank of the share at the sides of the perforation $d$, as in Fig. 1, to secure the tongue in that elongated perforation. The lugs $h$ are not required when the aperture $d$ is not elongated, as in Figs. 7 and 12, and the tongue $b$ is long enough to extend through and beyond and bear or bind against the upper and lower edges of that aperture, as shown in Fig. 7, the pressure of the ends of the spring A against the part B being in the directions of the arrows $z$ $z$ in Figs. 1 and 7. The tongue $e$, Fig. 1, or $e'$, Fig. 7, extends through and considerably beyond its corresponding socket-aperture $g$ or $g'$, so as to be capable of binding or bearing against the upper and lower edges of such aperture, as shown in Figs. 1 and 7, and thereby keeping the tongue in its aperture and the share in its proper working position when the share is supported on the outer end part of the spring by the tongue $b$ and shoulders $c$, in connection with the perforation $d$ in the share.

In using my above-described improved spring-tooth in harrows and cultivators any part of that portion of the spring A which is between its two lapping end parts is to be secured by any suitable known fastening devices to the top, bottom, side, or other part of the beam, as shall be convenient and desirable in each harrow or cultivator, the point of the share B being lowest and in position to properly engage with the soil, and one or the other or both of the two end parts of the spring being left free to vibrate with the share.

Before my invention a harrow-tooth or share without twist therein had its upper end and middle part jointed by hinges having pivot-bolts to the two ends of a bent or C-shaped spring which did not have its end parts lap one within the other in subvolute form.

I am aware that prior to my invention a spring-tooth for a harrow or cultivator has consisted of a subvolute spring and a share having its upper or shank portion secured by fulcrum-like joints to the two end parts of the subvolute spring, the share being twisted a quarter-way round and its upper portion indented and inserted in narrow slots through the two end parts of the spring; and I do not claim a spring-tooth having that construction.

What I claim as my invention is—

A spring-tooth composed of the subvolute spring A, having on its outer end part the tongue $b$ and shoulders $c$, in combination with the share B, having the perforation $d$, and thereby engaged with the outer end part of the spring, and the upper end part of the share and the inner end part of the spring being formed with a tongue on one, and a corresponding perforation in the other, and thereby jointed together, substantially as described.

In testimony whereof I hereunto set my hand, in the presence of two subscribing witnesses, this 26th day of January, 1881.

WM. HARTY.

Witnesses:
GEORGE. R. CLEVELAND,
JAMES W. HARTY.